Sept. 18, 1956 N. CUSHMAN 2,763,843

TUNING CIRCUIT

Filed March 30, 1953

INVENTOR.
NORTON CUSHMAN
BY
Connolly and Hutz
HIS ATTORNEYS 2,763,843
Patented Sept. 18, 1956

2,763,843

TUNING CIRCUIT

Norton Cushman, Williamstown, Mass., assignor to Sprague Electric Company, North Adams, Mass., a corporation of Massachusetts Application March 30, 1953, Serial No. 345,615

6 Claims. (Cl. 333—82)

Figures 1, 2, 3, 4, 5:
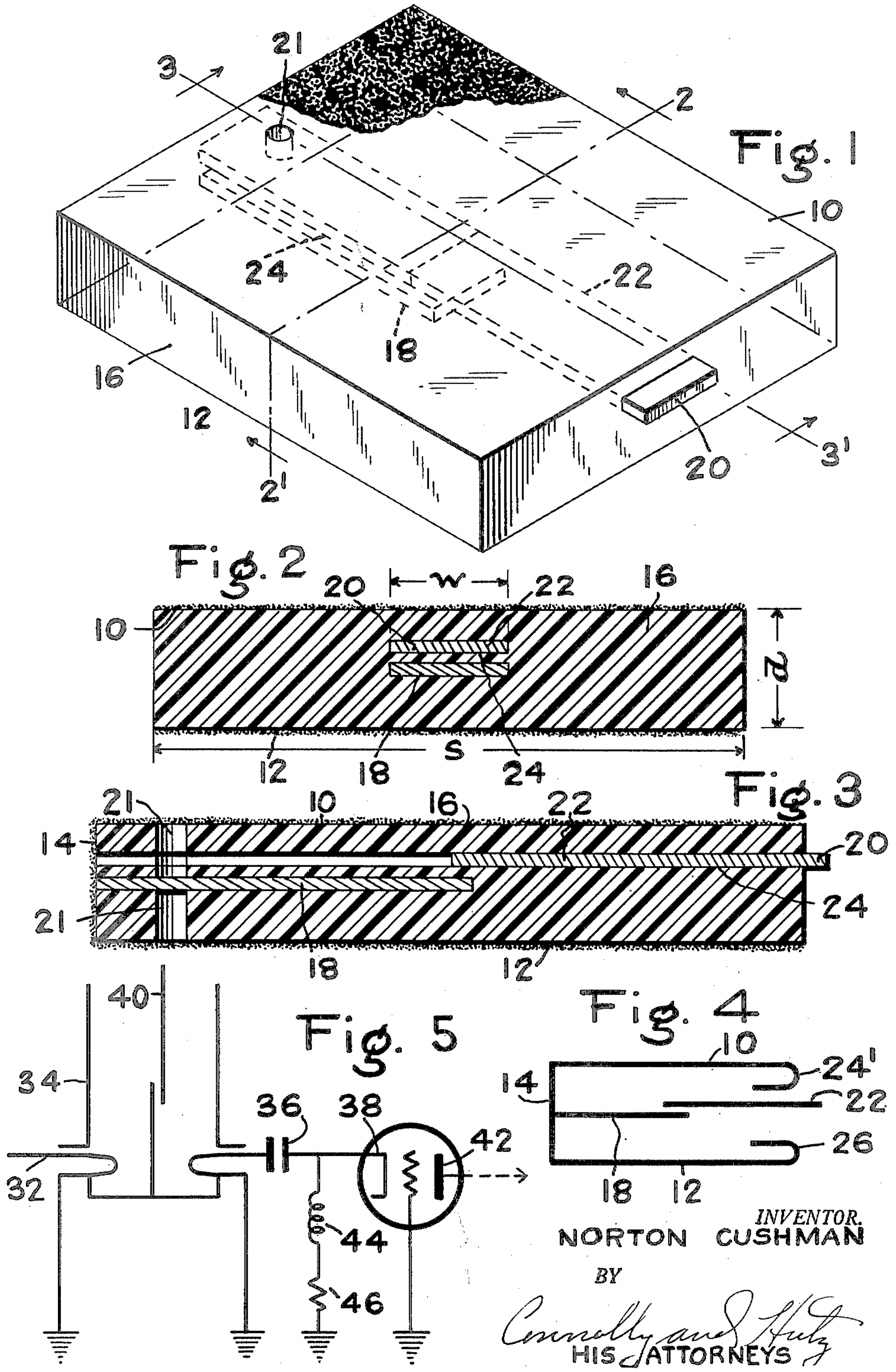

This invention relates to a transmission line and more particularly refers to an ultra high frequency tuning circuit. In the tuning of ultra high frequency circuits to a multiplicity of fixed channels with specific assigned frequencies, such as are used in the newly released phase of television broadcasting, it is highly desirable to have a tuning system which provides the same selectivity at each frequency, which is mechanically simple, avoids sliding electrical contacts and is easily adjustable to the desired frequency settings. In designing the equal inductance and capacitance of resonant circuits with either variable inductance or variable capacitance, it is most difficult to keep the various electrical characteristics uniform over this extremely wide range of adjustment, because it will be necessary to keep the *L/C* ratio constant, and the variation of but a single parameter will defeat the desired objective.

It is the usual practice to make tuning circuits of multiple lumped inductances and capacitances and to accomplish the tuning by pressure contact into the combinations of these components at various points. In practice the resonant circuits are constructed as the segments of a rotary selected switch with the inductors between the segments and the capacitors shunted between the inductors or to the ground. In some cases the distributed capacitance between inductors is used to resonate the circuit and the switch merely acts as a shorting bar. Many specific types of constructions for ultra high frequency tuners have appeared of late in the literature but all of them suffer from inherent physical and electrical disadvantages such as mechanical complexity, undesirable size, poor frequency response over the entire ultra high frequency range, movable electrical contacts with their inherent disadvantages, losses of signal strength, noise, etc.

It is an object of this invention to produce a new and improved resonant circuit which overcomes the foregoing and related disadvantages. A further objective is to produce a novel transmission line for a resonant circuit tunable over the entire ultra high frequency spectrum. Additional objects will become apparent from the following description and claims.

These objects are attained in accordance with the present invention wherein there is produced a tunable transmission line comprising an E shaped electrode, a movable electrode positioned adjacent to the center leg of said E shaped electrode and dielectric material physically separating said movable electrode from said E shaped electrode.

In a more restricted sense the invention is concerned with a tunable transmission line comprising a U shaped planar electrode, a fixed electrode positioned between the legs of said U shaped electrode, said fixed electrode electrically connected to the base of said U shaped electrode, a movable electrode positioned between the legs of said U shaped electrode and adjacent said fixed electrode, said movable electrode positioned planar to said fixed electrode and susceptible to movement to a position separated from, but overlapping, said fixed electrode, and a dielectric medium physically separating said movable electrode from said fixed electrode and said U shaped electrode.

The invention is also concerned with circuits employing the novel transmission lines of the invention. According to my invention, I produce a transmission line which consists first of a U shaped metal electrode positioned on a block of substantially rigid dielectric material, said electrode generally made of a metal foil or of a metal susceptible to being vaporized, printed, or attached onto the surface of the dielectric medium. Positioned between the legs of the U shaped electrode is a fixed electrode electrically and physically connected to the base segment of the U shaped electrode and separated from the legs of the U shaped electrode by the dielectric medium. Positioned between the legs of the U shaped electrode and adjacent to the fixed electrode is a slidable member comprising a dielectric medium having deposited on one of its surfaces a metal electrode which metal electrode may consist of an attached foil or a printed or metallized film. This movable member lies planar to the fixed electrode and is adjustable in a path planar to the fixed electrode so that it may be moved in a fashion so as to overlap the fixed electrode. The legs of the U shaped electrode are of such length that they overlap a substantial portion of the adjustable electrode but do not physically touch any portion thereof.

By properly proportioning the length of the legs of the U shaped electrode, the width of the fixed electrode and its cooperating slidable electrode, and the width of the legs of the U shaped electrode, it is possible to produce a tunable transmission line having resonant frequencies over the entire ultra high frequency spectrum, which device is compact, has low losses, an almost linear frequency response with displacement of the movable member and a variable Q. By correct selection of these physical parameters it is possible to change the resonant frequency of the device while at the same time keeping the signal losses at a desirable minimum and to maintain the *L/C* ratio constant which results in a relatively constant value of Q over the entire tunable range.

Reference will be made to the appended drawings in which: Figure 1 shows a diagrammatic view of the tunable transmission line of the invention; Figure 2 shows a crosswise section of the line 2—2′ of Figure 1; Figure 3 shows a crosswise section of the line 3—3′ of Figure 1; Figure 4 shows a modification of the crosswise section electrodes in Figure 3 so as to extend the tuning range of the tuned circuit; and Figure 5 shows representative circuits employing the tunable transmission line of the invention.

Referring more specifically to Figure 1, Nos. 10 and 12 represent the legs of the U shaped electrode while No. 14 indicates the base of the U shaped electrode. These electrodes are deposited upon the surface of a dielectric medium 16. Positioned in the dielectric medium 16 is the fixed electrode 18 which is electrically and physically connected to the base portion 14 of the U shaped electrode. The numeral 20 indicates the slidable member which moves planar to the fixed electrode 18 and this slidable member 20 consists of an electrode 22 positioned on a dielectric base 24. The path of this movable member 20 is such that it is planar to the fixed electrode 18 from a completely overlapping to a non-overlapping position. Any appropriate means may be used to move the slidable member 20.

Aperture 21 projects through the electrodes 10 and 20 to electrode 18 to provide means for coupling the signal source to the tuning assembly by magnetic or electrical coupling. Figure 2 is a cross section of Figure 1 on the plane defined by the Figures 2—2'. The width of the legs 10 and 12 at the base of the U shaped electrode is indicated by the letter *s* and the distance separating these two electrodes 10 and 12 is indicated by the letter *d*. The letter *w* refers to the width of the fixed electrode 18 and the movable electrode 22. It has been found that the electrical characteristics of this device can be varied considerably by the variations of these parameters which are indicated by their respective letters. More specifically it has been found that the loaded Q is a function of the ratio *w/d* and values up to a maximum of 100 have been achieved; the loaded Q of 100 resulting when the ratio is 3. Also by making the ratio of *s* to *w* 8 or greater, the signal loss is maintained at 1 db or less which is substantially below the minimum set by the television industry.

Figure 3 shows a cross-sectional view of Figure 1 defined by 3—3'. The legs of the U shaped electrodes 10 and 12 are shown to be physically and electrically joined to the base electrode 14. The fixed electrode 18 extends from the base electrode 14 on a plane parallel to that of the electrodes 10 and 12. The adjustable electrode 22 is shown to be planar to the fixed electrode 14 in an overlapping fashion but physically separated therefrom. Though the movable electrode 22 is physically separated from the fixed electrode 18 it is electrically connected thereto at the operational frequencies by the distributed capacitance which exists between the two electrodes. Though it is not completely understood, it is believed that the variation of the magnitudes of the distributed capacitance between electrodes 22 and 18 and 22 and 10 and 12, and their respective distributed inductance, is responsible for the variation of resonant frequency of the tuning device.

Where broad band reception is desired, as in most of the television channel applications in the ultra high frequency spectrum, it is desirable to have a less selective tuning circuit. It is to be noted that the value of the loaded Q previously recited is for a tuned transmission line of a certain configuration wherein the electrodes are thin films of aluminum and the dielectric medium is polystyrene. It is to be realized that the selectivity of this device is determined by its operational Q and this Q can be readily adjusted by varying the dielectric medium which is utilized or the ratio of *w/d*. Figure 4 shows an additional means for increasing the overall width of the tuning range of the disclosed invention. In Figure 4 the legs of the U shaped electrodes 10 and 12 have flange portions, 24' and 26, respectively, attached to their outward extremities and these flanges 24' and 26 project inwardly toward the movable electrode 22 and finally to a plane parallel to said movable electrode. These inwardly extending flanges increase the capitance loading of the tuned circuit, thereby extending the tuning range of the device.

Figure 5 shows an RF amplifier stage for an ultra high frequency television receiver. Input antenna 32 is coupled into the field of the transmission line tuning circuit 34. A coupling capacitor 36 places the desired tuned frequency spectrum on the cathode 38 of a grounded grid in the amplifier stage. The amplifier output is taken from the plate 42 of this stage. Inductance 44 and cathode resistor 46 serve the usual function of preventing the grounding of the signal and bias of the stage respectively. The adjustable electrode 40 of the transmission line tuned circuit 34 is moved in practice by a mechanical device which can either be manually operated in the selection of the desired frequency or is susceptible to being preset in a fashion well-known for push button operation. The electrode 40 can also be a poor conductor and/or insulator for low Q, broad banding.

As an example of the invention, a tunable transmission line conforming to the discussion previously set forth was prepared and the dimensions were such that it occupied a volume defined by the measurements of 4"x4½"x¼". The width of the base electrodes identified by the symbol *s* in Figure 2 was 4" and the letter *d* of Figure 2 was ¼" while the distance identified by the letter *w*, which is the width of the fixed and movable electrodes, was ½". The length of the fixed electrode and movable electrodes was 2¼" each. A 1 mil aluminum foil was used as the electrodes for the unit and the dielectric material consisted of polystyrene. The unloaded Q for the unit was approximately 1000 while the loaded Q was found to be a value of 80 and the db insertion loss for the device was of a value of 1.

Though the preferred dielectric material for certain electronic circuits is polystyrene, there are a host of inorganic and organic dielectric materials which would be highly suitable for utilization in this invention. When high capacities between the movable electrode and the fixed electrodes are desired, the insulating layers may be of a high dielectric constant material of $TiO_2$. Other typical inorganic dielectrics are steatite, vitreous enamel and glass e. g. lead glasses. For certain other operations a high dielectric possessing ferromagnetic properties such as available from the ferrites may be utilized in specific applications of this invention. Numerous organic resinous dielectric materials can be used such as the condensation product of phthalic anhydride and ethylene glycol, vinyl resins other than polystyrene, cross-linked polystyrene (DVB), polytetrahaloethylene resins, such as polytetrafluoroethylene, cross-linked cellulose acetate, polystyrene cross-linked with divinyl benzene, the epoxy type resins, etc. It must be realized that each of these dielectric materials has its peculiar properties which will lead to tuning transmission lines of various Q's, for example, the condensation product of phthalic anhydride and ethylene glycol has substantial losses at ultra high frequencies and thus will yield a tuned circuit of lower Q and broader bend width than that where polystyrene is used.

The electrodes for the tuning circuit can be attached foils, printed onto the surface of the dielectric, sputtered or condensed onto the dielectric means and fired on where the dielectric is susceptible to the process. Suitable electrode materials are aluminum, copper, gold, platinum, palladium, lead, zinc, silver, which is preferred, and alloys thereof. For broader band operation the electrodes can be adjusted to higher resistivity and greater inductance by choice of the conductor, the thickness of the electrode, and the presence of dispersed filler in the conductor film. By increasing the distributed inductance the range of tuning is enlarged.

The advantages of the invention are quite numerous. My construction is characterized by the absence of moving electrical contacts which eliminates many of the difficulties attendant with present devices. The preferred embodiment utilizing polystyrene cross-linked with divinyl benzene as the dielectric material has very low losses in the ultra high frequency spectrum. The tuning device is relatively simple to manufacture and the electrodes can be either printed upon the dielectric medium or deposited thereon with the usual vacuum techniques. The unit is quite compact and can be readily attached to the chassis or other desired location within the television set. It has been previously pointed out that the Q can be readily adjusted, thus giving a broad range of band width which the designer can designate for any specific electronic application. The individual tuning elements can be ganged if so desired. The frequency response of this device is virtually linear with displacement so that scales designating the frequency to which it is tuned are readily adapted.

It is to be realized that this device as discussed is a tuned quarter wave transmission line with a shorting element at one end of said line. The instant invention would also find its embodiment in a tuned transmission line of half wave length dimensions without the presence of the shorting element. In other words a tuned transmission line of this configuration of any wave length would be applicable as long as the signal is coupled to the amplifier stage by magnetic means at point of current maximum and electric coupling at the point of voltage maximum. A further variation is the utilization of multiple fixed electrodes and their associated multiple movable electrodes between the outer electrodes of the tunable transmission line.

As many apparently widely different embodiments of this invention may be made without departing from the spirit and scope hereof, it is to be understood that the invention is not limited to the specific embodiments hereof except as defined in the appended claims.

What is claimed is:

1. A tuning assembly comprising a generally flat block constructed of dielectric material, an electrode layer on each of two opposite outer surfaces of said block, and a third electrode layer on an outer surface of said block, said third electrode layer connecting said other two layers, a pair of spaced, parallel slots in said block, one of said slots extending from the surface on which said third electrode layer is positioned partially through said block, the other of said slots extending from the surface on which said third electrode layer is positioned compelely through said block, a fixed electrode in said first slot having one end thereof connected to said third electrode layer, a movable electrode in said second slot, said movable electrode having a width dimension substantially equal to said fixed electrode and being movable from a position adjacent that end of its corresponding slot which is remote from said third electrode layer to a position wherein it substantially overlies said fixed electrode.

2. The assembly of claim 1 wherein said fixed and movable electrodes are substantially narrower than said block.

3. The assembly of claim 1 wherein said electrode layers on the opposite surfaces of said block are provided with flanges which extend over that outer surface of the block which is opposite to said third electrode layer and which have inwardly folded portions spaced from and parallel to both the electrode layers from which they extend and the slot in which said movable electrode is positioned, said portions being spaced from both said slots and from said electrode layers by the dielectric material forming said block.

4. The assembly of claim 1 wherein openings are formed extending from opposite surfaces of said block toward the center thereof and being separated from each other by said fixed electrode the axis of said openings in said block lying in a plane which intersects the planes of said slots.

5. A tuning assembly comprising a generally flat block constructed of dielectric material, an electrode layer on each of the two opposite outer surfaces of said block, and a third electrode layer on the outer surface of said block, said third electrode layer connecting said other two layers, a fixed electrode connected to said third electrode and extending from the surface on which said electrode is positioned partially through said block, a slot extending from the surface on which said third electrode is positioned completely through said block and spaced from and parallel to said fixed electrode, a movable electrode in said slot, said movable electrode having a width dimension substantially equal to said fixed electrode and being movable from a position adjacent that end of its corresponding slot which is remote from said third electrode layer to a position wherein it substantially overlies said fixed electrode.

6. The assembly of claim 5 in which the dielectric material is polystyrene.

References Cited in the file of this patent

UNITED STATES PATENTS

| | | |
|---|---|---|
| 2,246,188 | Roder | June 17, 1941 |
| 2,503,256 | Ginzton et al. | Apr. 11, 1950 |
| 2,530,089 | Smith | Nov. 14, 1950 |

OTHER REFERENCES

"Etched Sheets Serve as Microwave Components," by R. M. Barrett; Electronics; June 1952, pp. 114–118, 333—10.